US007166759B2

(12) United States Patent
Nakamaru et al.

(10) Patent No.: US 7,166,759 B2
(45) Date of Patent: Jan. 23, 2007

(54) REMEDIATION METHOD OF MEDIA AND IRON POWDER FOR DEHALOGENATION OF HYDROGENATED HYDROCARBONS

(75) Inventors: Hiroki Nakamaru, Chiba (JP); Haruhiko Miyazawa, Chiba (JP); Yoshiei Kato, Chiba (JP)

(73) Assignee: JFE Steel Corporation (JP)

( * ) Notice: Subject to any disclaimer, the term of this patent is extended or adjusted under 35 U.S.C. 154(b) by 0 days.

(21) Appl. No.: 10/045,316

(22) Filed: Nov. 7, 2001

(65) Prior Publication Data
US 2002/0155050 A1 Oct. 24, 2002

(30) Foreign Application Priority Data
Nov. 15, 2000 (JP) ............... 2000-347869
Oct. 5, 2001 (JP) ............... 2001-310454

(51) Int. Cl.
*A62D 3/00* (2006.01)
*C02F 1/68* (2006.01)
*C02F 1/70* (2006.01)
*B09C 1/08* (2006.01)
*B09C 1/10* (2006.01)

(52) U.S. Cl. ............... 588/319; 588/406; 588/901; 210/749; 210/757; 405/128.75

(58) Field of Classification Search ............... 588/205, 588/206, 207, 248, 319, 406, 901; 210/749, 210/757; 423/240 R, 240 S; 405/128.75
See application file for complete search history.

(56) References Cited

U.S. PATENT DOCUMENTS

| | | | | |
|---|---|---|---|---|
| 5,575,927 A | * | 11/1996 | Sivavec et al. | 210/757 |
| 5,938,814 A | * | 8/1999 | Uenosono et al. | 75/254 |
| 6,039,882 A | * | 3/2000 | Wolfe et al. | 210/747 |
| 6,068,777 A | | 5/2000 | Kimura et al. | |
| 6,217,779 B1 | * | 4/2001 | Orth et al. | 210/757 |
| 6,287,472 B1 | * | 9/2001 | Gillham et al. | 210/747 |
| 6,436,868 B1 | * | 8/2002 | Imai et al. | 502/185 |

FOREIGN PATENT DOCUMENTS

| | | | |
|---|---|---|---|
| EP | 1166904 | * | 2/2002 |
| EP | 1206949 | * | 5/2002 |
| JP | 07-278725 | * | 10/1995 |
| JP | 10-263522 | | 10/1998 |
| JP | 11-235577 | | 8/1999 |
| JP | 2000-5740 | | 1/2000 |
| JP | 2000-80401 | | 3/2000 |
| JP | 2000-080401 | * | 3/2000 |
| WO | 97 04868 A | | 2/1997 |
| WO | 97 14656 A | | 4/1997 |
| WO | WO 97/14656 | * | 4/1997 |
| WO | 00 29137 A | | 5/2000 |

OTHER PUBLICATIONS

Chemical Abstract accession No. 121:237928: "Degradation of carbon tetrachloride in the presence of iron and sulfur containing compounds," Lipczynska-Kochany et al., Chemosphere (1994), 29(7), pp. 1477-1489 (Chemical Abstract only).*
"Conversion of refractory and toxic organics to harmful substances-reductive degradation of trichloroethylene by iron powder," Industrial Water, No. 369, 1989, partial translation of Fugure 6 only.*
Kawasaki Steel, KIP Reduced Iron Powders, Atomized Iron and Steel Powders, pp. 1-21, 1999.
Hassan S.M., "Reduction of halogenated hydrocarbons in aqueous media: I Involvement of sulfur in iron catalysis" *Chemosphere* vol. 40 (Jun. 2006) pp. 1357-1363.
E. C. Butler et al., "Factors Influencing Rates and Products in the Transformation of Trichloroethylene by Iron Sulfide and Iron Metal, *Environmental Science and Technology*" vol. 35, No. 19, 2001, pp. 3884-3891.
Nakamaru Hiroki et al., "Effect of the microstructure of an iron powder on the reactivity with trichoroethylene" 224th ACS National Meeting 0-8412-3840-5 American Chemical Society, Boston MA, Aug. 18-22, 2002.
Ohiroyuki Ito et al., *Reduction decomposition of chlorinated organic compounds by the iron powder*, Research Meeting on the Groundwater/soil Pollution and its Prevention Measures, Tokyo, Jun. 1997 w/translation.
Toshimune Kimura, *Treatment of hazardous substances including heavy metals in wastewater by iron powder method*, PPM, vol. 13, No. 9, 1982 w/translation.
*Conversion of refractory and toxic organics to harmful substances-reductive degradation of trichloroethylene by iron powder*, Industrial Water, No. 369, 1989.

* cited by examiner

*Primary Examiner*—Colleen P. Cooke
(74) *Attorney, Agent, or Firm*—DLA Piper US LLP

(57) ABSTRACT

The invention provides a remediation method of soil, water and/or gases by prompt dehalogenation of halogenated hydrocarbons by allowing the halogenated hydrocarbons contained at least in one of the soil, water and/or gases to contact an iron powder containing about 0.03 to about 2% by mass of sulfur preferably on the surface, and an iron powder for use in the remediation method.

16 Claims, 2 Drawing Sheets

20 μm

20 μm

20 μm

20 μm

20 μm

20 μm

20 μm

20 μm

REMEDIATION METHOD OF MEDIA AND IRON POWDER FOR DEHALOGENATION OF HYDROGENATED HYDROCARBONS

BACKGROUND

1. Technical Field

The invention relates to a method for decontaminating halogenated hydrocarbons toxic to humans by eliminating halogens from the halogenated hydrocarbons. More specifically, the invention relates to a method for decontaminating the halogenated hydrocarbons contained in polluted media such as soil, water and/or gas by dehalogenation, and an iron powder for dehalogenation of the halogenated hydrocarbons (referred to as an environment remediation iron powder, or simply as a remediation iron powder).

2. Description of the Related Art

The remediation method for the soil and ground water polluted with the halogenated hydrocarbons harmful to humans is categorized as (1) a method for treating the polluted soil and ground water while maintaining their current situations (an in situ treatment), (2) a method for treating gases in the polluted soil or polluted ground water after pumping from the ground (treatment after in situ extraction) and (3) a method for treating the polluted soil after excavation (excavation treatment).

A method using an iron powder as a reductant for decontamination of harmful halogenated hydrocarbons by dehalogenation has been proposed. For example, Japanese Unexamined Patent Application Publication No. 10-263522 proposes a remediation method of soil and soil moisture by forming an iron powder dispersion layer in the soil followed by allowing ground water to contact the layer for decontamination of the halogenated hydrocarbons. Japanese Unexamined Patent Application Publication No. 11-235577 also proposes a remediation method of soil by adding the iron powder to and mixing with the soil (excavated or not) for decontaminating the soil by dehalogenation.

The patent publication cited above (Japanese Unexamined Patent Application Publication No. 10-263522) describes that reductive power of the iron powder is reduced by forming iron oxide on the surface of the iron particles by a reaction with oxygen in the soil. As a counter measure of this problem, the patent publication also proposes deoxygenation of the soil in the vicinity of the iron powder by allowing a reductive substance to disperse in the soil. This means that persistence of the reductive power of the iron powder is a problem in the former patent publication.

The method described in the latter patent publication (Japanese Unexamined Patent Application Publication No. 11-235577) proposes an iron powder containing 0.1% by mass or more of carbon and having a specific surface area of 500 $cm^2/g$ or more, wherein the iron powder comprises sponge like particles having a pearlite texture as a structure with a particle size distribution that allows 50% or more of the total powder to pass through a 150 µm sieve.

However, dehalogenation ability of the iron powder disclosed in that patent publication is not always sufficient and it appears that the component of the iron powder is not optimized.

An iron powder containing 0.020 to 0.5% by weight of phosphorous, sulfur or boron has been proposed for efficiently removing phosphor compounds in drainage (Japanese Unexamined Patent Application Publication No. 2000-80401). According to the patent publication, iron powder is rapidly dissolved in the drainage due to selected trace elements in the iron powder, and has a high decontamination ability of phosphorous compounds. The objective effect thereof is to accelerate decontamination of phosphor in the drainage by increasing the dissolving speed of iron.

According to the mechanism of the iron powder disclosed in the foregoing patent publication, a compound which hardly dissolves and has a small solubility product constant such as iron phosphate is formed between the dissolved iron and phosphor in the drainage to remove phosphor in the drainage by precipitation. This technology is fundamentally different from the technology for reductive decomposition of harmful substances on the surface of iron according to this invention.

The patent publication cited above describes that the iron powder can efficiently remove other harmful substances such as heavy metals and chlorinated organic compounds as well. However, the removal mechanism of other respective harmful substances are not explained. That patent publication assumes the same mechanism for removal of the phosphorous compounds, or only exemplifies as one of general uses of the iron powder.

Further, no applications to the soil and/or groundwater are described in the patent publication cited above.

Another patent publication proposes an iron powder containing 0.1 to 10% by mass of copper for removing the halogenated hydrocarbons in the soil and/or groundwater (Japanese Unexamined Patent Application Publication No. 2000-5740). However, copper itself is a harmful metal with a danger of secondary pollution.

OBJECT OF THE INVENTION

Polluted groundwater may bring about far more crucial damage over surface drainage, since identification of pollution sources is usually difficult in the polluted groundwater as compared to polluted surface drainage. Accordingly, prompt decontamination of the polluted groundwater has been urgently required. Persistence of the activity of the iron powder as a reductant is also strongly required for using the iron powder because the iron powder cannot be frequently replaced.

The halogenated hydrocarbon may also be present as a gas in the polluted soil and air different from the halogenated hydrocarbons in the drainage and groundwater. Therefore, it is advantageous to establish a method for efficiently decontaminating halogenated hydrocarbons in the gas for remediation of the polluted soil and air.

SUMMARY

The invention provides a remediation method of media including soil, water and/or gases by dehalogenation of halogenated hydrocarbons by contacting halogenated hydrocarbons contained at least in one of the media, soil, water and/or gases with an iron powder containing about 0.03 to about 2% by mass of sulfur.

Preferably, the iron powder contains about 0.1% by mass or less of manganese.

Preferably, precipitates of sulfur are exposed on the surface of the iron powder. The amount (or numbers) of the precipitated sulfur on the surface is preferably assessed by the amount of Fe—S based compounds existing on the surface.

The invention also provides an iron powder for dehalogenation of halogenated hydrocarbons containing about 0.03 to about 2% by mass of sulfur.

Preferably, the iron powder for dehalogenation of halogenated hydrocarbons contains about 0.1% by mass or less of manganese.

Preferably, the iron powder for dehalogenation of halogenated hydrocarbons comprises precipitates of sulfur exposed on the surface of the iron powder. The amount of the precipitated sulfur on the surface is also preferably assessed by the amount (or numbers) of Fe—S based compounds present (precipitated) on the surface.

The iron powder as hitherto described is preferably manufactured by a water atomization method. The iron powder manufactured by the water atomization method may be directly used, or an iron powder obtained by finish reduction of the iron powder manufactured by the water atomizing method may be used depending on the application fields.

DESCRIPTION OF THE PREFERRED EMBODIMENTS

Figure 1:
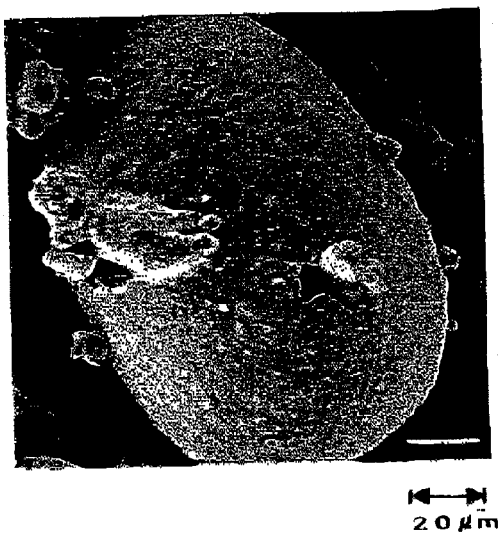
FIG. 1 shows a SEM photograph (with a magnification of 500) of the surface of the atomized iron powder (an iron powder obtained by finish reduction of a water atomization iron powder containing 0.4% by mass of sulfur and 0.05% by mass of manganese) according to the invention.

We have discovered the decontamination of harmful halogenated hydrocarbons is accelerated by dehalogenation (reduction) by contact with iron powder containing an appropriate amount of sulfur in iron powder particles. Although the reason why addition of sulfur is effective has not been made clear yet, we believe that inorganic compounds mainly comprising sulfur (iron compounds of sulfur) precipitated in the iron powder also precipitates on the surface of the iron powder, and a local cell reaction is enhanced by allowing the surface precipitation site to function as a local cathode.

In the local cell reaction as used herein, anodes and cathodes are formed on the surface of the iron powder, and oxidation of iron takes place at the anode while reduction of the harmful halogenated hydrocarbons proceeds at the cathode. Since organic compounds are formed causing reductive dehalogenation, we believe that the polluted media, soil, water (groundwater) and gas (air) are decontaminated or remediated when the halogenated hydrocarbons are thought to be harmful.

The halogenated hydrocarbons are those containing halogens such as chlorine and bromine bound to the hydrocarbon molecule. While they mainly comprise volatile halogenated hydrocarbons such as trichloroethylene (abbreviate as TCE), tetrachloro-ethylene, 1,1,1-trichloroethane, 1,1,2-trichloroethane, 1,1-dichloroethylene, cis-1,2-dichloroethylene, trans-1,2-dichloroethylene, 1,1-dichloroethane, dichloromethane, carbon tetrachloride, methyl chloride, chloroform, methyl chloroform, 1,1,2,2-tetrachloroethane, 1,2-dichloropropane, 1,3-dichloropropane, methyl bromide, 2-bromopropane, 1,3-dibromopropane, 1,4-dibromopropane and allyl bromide, PCB and dioxin, or so, may be also be subject to the method of the invention.

Halogenated hydrocarbons typically leak from tanks and drainage, permeate into the soil and reside there. A part of the halogenated hydrocarbons are dissolved in the moisture in the soil and groundwater in a small concentration, while a part of the remaining halogenated hydrocarbons are gasified in the air.

The halogenated hydrocarbons are reduced with the iron powder and converted into harmless non-halogen compounds. For example, TCE receives electrons (reduced) on the surface of the iron powder to form unstable intermediate compounds such as chloroacetylene by beta-elimination, and the intermediate compounds are finally decomposed to acetylene containing no chlorine atoms. Although reduction may proceed further, harmful compounds are converted into harmless compounds in any case by initiation by reception of electrons (reduction) on the surface of the iron powder.

Since sulfur in the iron powder is an element to deteriorate corrosion resistance, its content is usually restricted within a range of less than 0.03% by mass of the iron powder. However, the iron powder to be used in the invention contains about 0.03 to about 2% by mass of sulfur that is a larger content than usual. The preferable sulfur content is in the range of about 0.1 to about 1.0% by mass.

When the sulfur content is less than about 0.03% by mass, a local cell reaction by precipitated sulfur compounds is insufficient to initiate a dehalogenation reaction from being sufficiently promoted. When the sulfur content exceeds about 2% by mass, on the other hand, reactivity of the dehalogenation reaction decreases.

Since an iron powder containing a large quantity of sulfur is used in the invention, substantial quantities of sulfur are precipitated on the surface of the iron powder in a process of making or preparing iron powder such as a water atomization. Consequently, the local cell reaction is enhanced by using the iron powder for remediation, thereby accelerating dehalogenation. It is desirable from the results of investigations to be described hereinafter that the configuration of sulfur precipitated on the surface is Fe—S based compounds.

Although the iron powder usually contains about 0.2% by mass or more of manganese, the manganese content of the iron powder to be used in the invention preferably contains about 0.1% by mass or less, more preferably about 0.06% by mass or less, of manganese. The dehalogenation accelerating effect as a result of the large content of sulfur tends to be weakened when the manganese content is larger than the upper limit of the content above. We believe that the Mn—S based compounds formed by the reaction of manganese with sulfur has an inferior ability to accelerate the dehalogenation reaction.

The surface state of the iron powder for use in dehalogenation according to the invention will be described hereinafter by means of a scanning electron microscope (SEM) photograph in place of a drawing.

Figure 2:
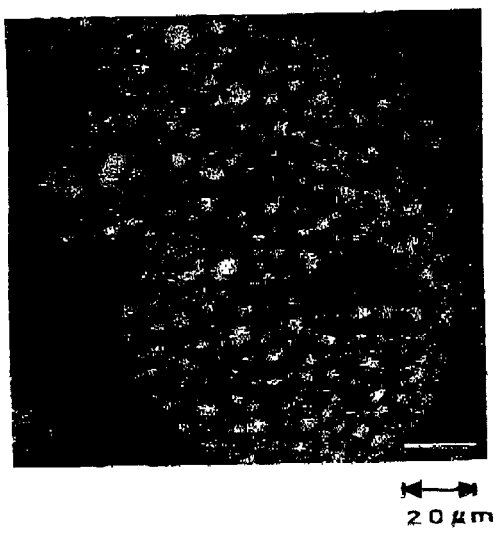
FIG. 2 shows the result of analysis (EBS image with a magnification of 500) of sulfur on the surface of the atomized iron powder shown in FIG. 1 by EPMA.
Figure 3:
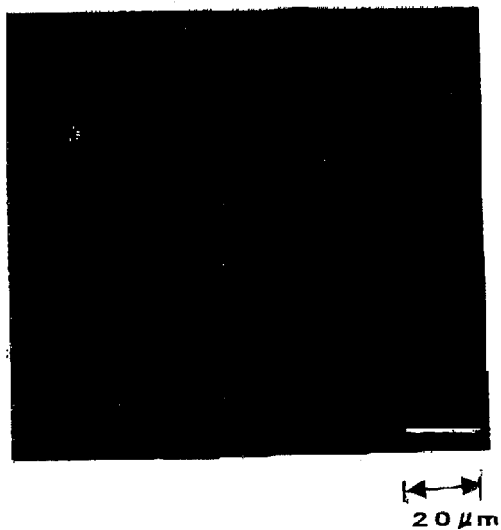
FIG. 3 shows the result of analysis (EBS image with a magnification of 500) of manganese on the surface of the atomized iron powder shown in FIG. 1 by EPMA.
Figure 4:
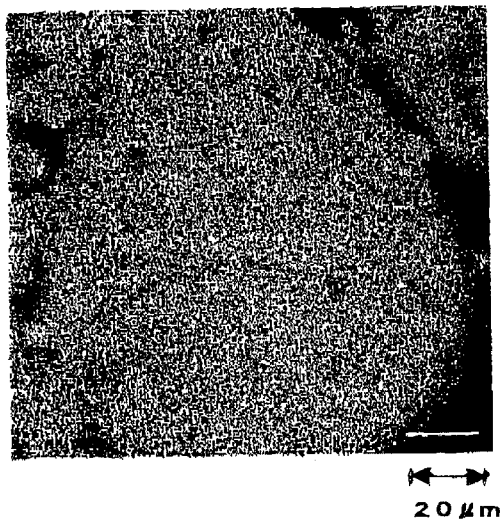
FIG. 4 shows the result of analysis (EBS image with a magnification of 500) of iron on the surface of the atomized iron powder shown in FIG. 1 by EPMA.

FIG. 1 shows the scanning electron microscope (SEM) photograph of the surface of the iron powder after a water atomization iron powder containing 0.4% by mass of sulfur and 0.05% by mass of manganese is subjected to a reduction treatment at 700° C. for 1 hour in a hydrogen stream. FIGS. 2 to 4 show assay results (EBS images) with an electron microanalyzer (EPMA) of sulfur, manganese and iron in the corresponding field of vision.

Figure 5:
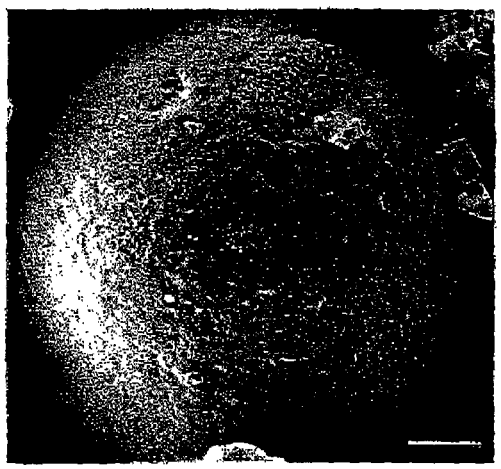
FIG. 5 shows a SEM photograph (with a magnification of 500) of the atomized iron powder (an iron powder obtained by finish reduction of a water atomization iron powder containing 0.4% by mass of sulfur and 0.5% by mass of manganese) in another embodiment of the invention.
Figure 6:
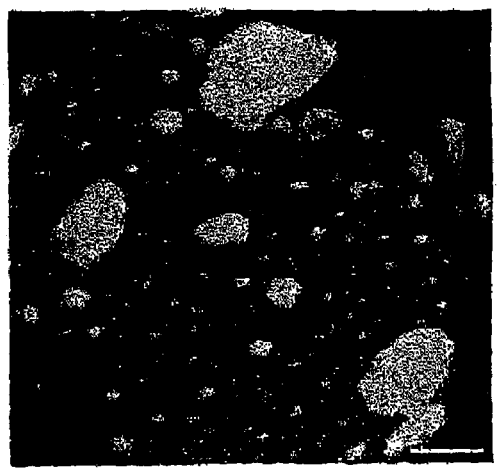
FIG. 6 shows the result of analysis (EBS image with a magnification of 500) of sulfur on the surface of the atomized iron powder shown in FIG. 5 by EPMA.
Figure 7:
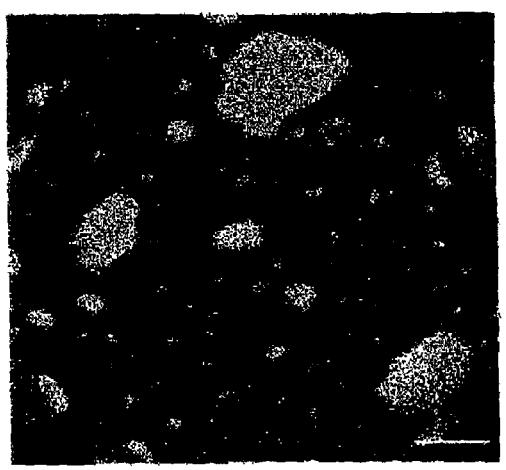
FIG. 7 shows the result of analysis (EBS image with a magnification of 500) of manganese on the surface of the atomized iron powder shown in FIG. 5 by EPMA.
Figure 8:
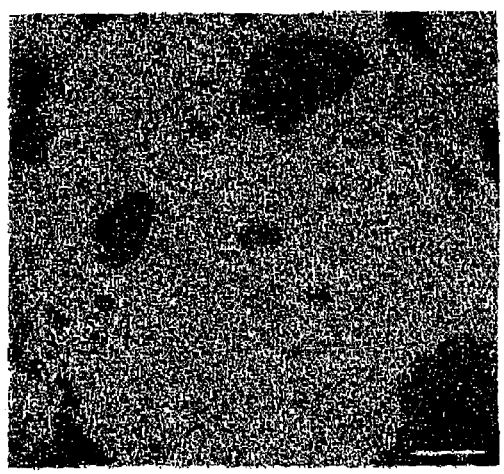
FIG. 8 shows the result of analysis (EBS image with a magnification of 500) of iron on the surface of the atomized iron powder shown in FIG. 5 by EPMA.

Similarly, FIG. 5 shows the scanning electron microscope (SEM) photograph of the surface of the iron powder after a water atomization iron powder containing 0.4% by mass of sulfur and 0.5% by mass of manganese is subjected to a reduction treatment at 700° C. for 1 hour in a hydrogen stream. FIGS. 6 to 8 show EBS images of sulfur, manganese and iron in the corresponding field of vision.

The magnification of the photographs in FIGS. 1 to 8 is 500, and the scale at right-bottom of each field of vision denotes a length of 20 μm.

Manganese is not precipitated on the surface as shown in FIGS. 2 to 4 when the iron powder contains 0.05% by mass of manganese. Sulfur precipitated on the surface is believed to mainly comprise the Fe—S based compound.

When the iron powder contains 0.5% by mass of manganese, on the other hand, the precipitation site of sulfur approximately coincides with the precipitation site of manganese as shown in FIGS. 6 to 8. This may suggest that sulfur is precipitated as a Mn—S based compound.

A difference may be observed between the reactivity of the local cells formed by the precipitated Fe—S based compound and Mn—S based compound, respectively, on the surface of the iron powder, since electrical conductivity of the former compound is largely different from the electrical conductivity of the latter compound. Actually, the difference is on the order of five digits as determined by the comparison between pure compounds of them. In other words, Fe—S has an electrical resistivity of $6 \times 10^{-6}$ Ω·m while MnS has an electrical resistivity of $1 \times 10^{-1}$ Ω·m. Therefore, the Fe—S compound having a higher conductivity has a very large local cell forming ability when it is precipitated on the surface as compared with the Mn—S compound precipitated on the surface. Accordingly, the Fe—S compound may have a quite large dehalogenation promoting effect.

The manganese content is preferably suppressed to be as small as possible since dehalogenation of the halogenated hydrocarbons is accelerated as the manganese content is decreased in the iron powder containing a large quantity of sulfur according to the invention.

There are no hindrances in acceleration of dehalogenation in the iron powder according to the invention even when a small amount of other components (impurities) are contained. While representative impurities are about 0.005 to about 0.2% by mass of carbon, about 0.005 to about 0.30% by mass of silicon, about 0.005 to about 0.9% by mass of oxygen and about 0.005 to about 0.05% by mass of phosphorous, the contents are not restricted thereto. Other inevitable impurities, about the amount in commercial iron powders, may also be contained.

The iron powder according to the invention is preferably manufactured by water atomization of molten steel containing a considerable amount of sulfur. An iron powder whose surface oxidation film formed by atomization is reduced, for example, in a dry hydrogen stream may be used. Cutting debris of a free-machining steel containing a high concentration of sulfur may be also used.

The suitable mean particle diameter of the iron powder according to the invention differs depending on the application fields. A too fine iron powder is not preferable from the view point of prevention of clogging, when the iron powder is filled within a permeable wall for remediation of polluted groundwater. An iron powder having a particle size distribution in which about 50% by mass or more of the iron powder cannot pass through a 150 μm sieve is preferably used.

An iron powder having a particle size distribution in which about 50% by mass or more of the iron powder can pass through a 150 μm sieve is preferably used in the application for mixing the iron powder with a soil in the zone of aeration or excavated soil.

The iron powder according to the invention may be applied to various media including polluted soil, water such as groundwater, and gases such as air by methods known in the art. For example, the iron powder is allowed to contact the halogenated hydrocarbons by spraying or mixing, or by injection of the iron powder or a slurry of the iron powder, for remediation of polluted soil and/or polluted groundwater. When referring to "media" and/or "soil", these terms are intended to apply broadly to include excavated or unexcavated soil, municipal, refinery or chemical sludges or particulates, waterway and lagoon sediments and the like.

The moisture content of the soil is preferably about 40% by mass or more. A reduction accelerating agent may be used together with the iron powder.

When the ion powder is applied for excavated polluted soil, the iron powder may be also allowed to contact the halogenated hydrocarbons by spraying or mixing, or by injection of the iron powder or a slurry of the iron powder, considering the moisture content, soil quality and soil pressure.

It is preferable that the soil is previously crushed to have a small diameter to allow the soil to contact the iron powder, when the excavated soil is viscous and has a large particle diameter. Groundwater may be allowed to passed through a permeable layer in the ground in which the iron powder has been added.

The amount of the iron powder used relative to the amount of the soil and groundwater is appropriately determined depending on the type of decontamination or the degree of pollution of the polluted soil.

(1) When the polluted soil and ground water is treated in situ, usually about 0.1 to about 10% by mass, preferably about 0.5 to about 5% by mass, of the iron powder may be used relative to the object (soil and the like) to be remedied.

(2) When polluted groundwater is pumped (extracted) for remediation, usually about 0.1 to about 10% by mass, preferably about 0.5 to about 5% by mass of the iron powder may be used relative to the polluted groundwater.

(3) When the polluted soil is treated by excavation, usually about 0.1 to about 10% by mass, preferably about 0.5 to about 5% by mass, of the iron powder is used.

Since the iron powder is harmless, it is of no particular problem to leave it in the soil and groundwater upon completion of dehalogenation.

When the iron powder is applied for polluted air, the air may be allowed to flow through a vessel filled with the iron powder to permit the air to contact the iron powder. While the surface of the iron powder is required to be wet, adsorbed water is sufficient. One or more layers of water molecule layers are preferably formed on the surface of the iron powder.

Relative humidity of the air or atmosphere is preferably about 50% or more. Fillers and a reduction accelerating agent may be filled in the vessel in addition to the iron powder.

EXAMPLES (Manufacture of Iron Powder)

A molten steel whose composition which had been adjusted by adding sulfur was melted by heating at 1700° C. After atomizing at a hydraulic pressure of 1177 MPa with water, the iron powder was sequentially dehydrated, dried, crushed (ground) and sieved. The iron powder after passing through a 180 μm sieve was used for the dehalogenation experiments to be described hereinafter.

The water atomized iron powder was independently subjected to finish reduction in a hydrogen atmosphere at 900° C. for 1 hour. A water atomized iron powder with finish reduction was prepared by sieving through a 180 μm sieve after crushing the raw iron powder to employ it in the dehalogenation experiments to be described hereinafter. The iron powder was decarbonized and annealed during the finish reduction.

Sulfur, manganese, carbon, silicon, phosphorous and oxygen contained in the water atomized iron powder and water atomized iron powder with finish reduction were analyzed according to JIS G1215, G1257, G1211, G1258, G1258 and Z2613, respectively. The content of each component in the iron powders used for the experiments is listed in Table 1.

The degree of precipitation of the sulfur compound on the surface of the iron powder was measured by the following procedure.

(1) Ten iron powder particles with a size that can accommodate one particle in one field of vision (with a magnification of 500) were selected from the iron powder samples, and a SEM photograph and EBS images of S and Mn were taken from the same field of vision using EPMA with a magnification of 500.

(2) The number (N) of the sulfur precipitate particles was counted in a field of vision of 50 μm×50 μm, and the value of N was defined to be the degree of precipitation of the sulfur compound on the surface (in a unit of number of particles/250 μm$^2$) effective for dehalogenation. The particle overlapping the manganese precipitate was considered to be a Mn—S based compound, and was excluded from the count of the N value.

The degree of precipitation obtained (corresponds to the degree of precipitation of the Fe—S based compound) is listed in Table 1.

(Dehalogenation)

Both the water atomized iron powder and water atomized iron powder with finish reduction used for dehalogenation had a specific surface area of 0.01 to 0.2 m$^2$/g as determined by the BET method.

In 100 ml each of five glass vials, 50 ml of an aqueous solutions containing calcium carbonate with a concentration of 40 mg/L (liter), sodium bisulfate with a concentration of 80 mg/L and trichloroethylene (TCE) with a concentration of 5 mg/L was added followed by adding 5 g of the iron powder (water atomized iron powder or water atomized iron powder with finish reduction) Each vial was then sealed with butyl rubber with a fluorinated resin sheet and an aluminum cap. The sealed sample was shaken in the vertical axis direction of the vial at a rotational speed of 180 rpm in a constant temperature chamber controlled at 23±2° C. The concentration of the TCE gas stored in the head space of each vial was analyzed with a gas detector tube at a predetermined time interval after initiation of shaking to measure the concentration of TCE in water. The vial once opened was not used for the analysis thereafter. The predetermined time intervals were one day, three days, five days, seven days, and ten days, respectively.

(Dehalogenation Speed of TCE)

The TCE concentration in water was measured, and the time and the logarithm of the TCE concentration divided by the initial concentration were plotted along the horizontal and vertical axes, respectively. The first order reaction rate constant (hr$^{-1}$) was calculated from the slope of the plot, and the constants are listed in Table 1. The first order reaction rate constant hardly varied within the above time intervals.

TABLE 1

|  | Content of element in iron powder (% by mass) | | | | | | Degree of precipitation of S compound | Application of finish reduction | First-order rate constant of dehalogenation of TCE (hr$^{-1}$) |
|---|---|---|---|---|---|---|---|---|---|
|  | S | Mn | C | Si | P | O | | | |
| Example 1 | 0.03 | 0.05 | 0.05 | 0.08 | 0.03 | 0.90 | 20 | No | 0.01 |
| Example 2 | 0.1 | 0.06 | 0.05 | 0.08 | 0.03 | 0.70 | 30 | No | 0.08 |
| Example 3 | 0.20 | 0.09 | 0.005 | 0.08 | 0.15 | 0.70 | 20 | No | 0.06 |
| Example 4 | 0.4 | 0.05 | 0.005 | 0.08 | 0.03 | 0.05 | 20 | Yes | 0.07 |
| Example 5 | 0.94 | 0.04 | 0.005 | 0.08 | 0.01 | 0.05 | 30 | Yes | 0.09 |
| Example 6 | 0.10 | 0.05 | 0.05 | 0.08 | 0.01 | 0.05 | 10 | Yes | 0.04 |
| Example 7 | 0.20 | 0.40 | 0.10 | 0.08 | 0.03 | 0.60 | 0 | No | 0.01 |
| Example 8 | 0.20 | 0.40 | 0.005 | 0.08 | 0.04 | 0.05 | 0 | Yes | 0.02 |
| Comparative example 1 | 0.014 | 0.05 | 0.15 | 0.08 | 0.016 | 0.90 | 0 | No | 0.001 |
| Comparative example 2 | 0.014 | 0.05 | 0.005 | 0.08 | 0.016 | 0.05 | 0 | Yes | 0.005 |

The iron powders in Examples 1 to 8 contain large quantities of sulfur with a large degree of precipitation on the surface. Consequently, the TCE dehalogenation rate constants in Examples 1 to 8 are large with higher dehalogenation rate constants. An obvious degree of precipitation of sulfur of 10 or more was observed in the samples in Examples 1 to 6 containing 0.1% by mass or less of Mn with higher TCE dehalogenation rate constants. The TCE dehalogenation rate constant becomes higher as the degree of precipitation of sulfur is increased to 20, 30 and so on.

Since the iron powders in Comparative Examples 1 and 2 contain less sulfur, no precipitation of sulfur on the surface is observed with a considerably slower dehalogenation rate.

The invention provides a method suitable for practical remediation of polluted soil, water such as groundwater and gases such as air, and an iron powder for use in remediation, wherein the dehalogenation rate constant is remarkably and unexpectedly higher in the invention as compared with decontamination treatment by dehalogenation of the halogenated hydrocarbons using conventional iron powder, thereby remarkably enhancing decontamination without adding harmful heavy metal components.

What is claimed is:

1. A method of remediating media contaminated with halogenated hydrocarbons comprising:
    forming Fe—S based inorganic compounds mainly comprising sulfur on at least portions of surfaces of iron powder particles containing about 0.1 to about 2% by mass of sulfur and about 0.06% by mass or less of manganese, based on the mass of the iron powder, wherein the Fe—S based inorganic compounds are formed by precipitation of iron and sulfur contained in the iron powder particle;
    subsequently contacting the halogenated hydrocarbons contained in the media with the iron powder; and
    causing reduction of halogenated hydrocarbons.

2. The method according to claim 1, wherein said media is selected from the group consisting of soil, water and gases.

3. The method according to claim 1, wherein about 0.1 to about 10% by mass of the iron powder is contacted with the media containing the halogenated hydrocarbons, based on the mass of the media.

4. The method according to claim 1, wherein the halogenated hydrocarbons are selected from the group consisting of trichloroethylene, tetrachloroethylene, 1,1,1-trichoroethane, 1,1,2-tricholrethane, 1,1-dichoroethylene, cis-1,2-dichloroethylene, trans-1-2-dichloroethylene, 1,1-dichoroethane, dichoromethane, carbon tetrachloride, methyl chloride, chloroform, methyl chloroform, 1,1,2,2-tetrachloroethane, 1,2-dichloropropane, 1,3-dichloropropane, methyl bromide, 2-bromopropane, 1,3-dibromopropane, 1,4-dibromopropane, allyl bromide, PCB and dioxin.

5. The method according to claim 1, wherein contacting the iron powder with the media is achieved by spraying on, mixing with or injecting into the media.

6. The method according to claim 1, wherein surfaces of the iron powder are wet with at least one or more layers of water molecule layers.

7. The method according to claim 1, wherein the forming of Fe—S is conducted by manufacturing the iron powder by water atomization of molten steel.

8. The method according to claim 7, wherein the iron powder is a non-reduced water-atomized iron powder.

9. The method according to claim 1, wherein the degree of surface precipitation of the Fe—S based inorganic compounds is 10 or more in a unit of number of particles per 250 $\mu m^2$.

10. The method according to claim 1, wherein the S content of the iron particles is about 0.1 to about 0.4%.

11. The method according to claim 1, wherein the degree of surface precipitation of the Fe—S based inorganic compounds is 10–30 in a unit of number of particles per 250 $\mu m^2$.

12. A method of remediating media contaminated with halogenated hydrocarbons comprising:
    forming Fe—S based inorganic compounds mainly comprising sulfur on at least portions of surfaces of iron powder by precipitation of sulfur in the iron powder containing about 0.1 to about 2% by mass of sulfur and about 0.1% by mass or less of manganese, based on the mass of the iron powder;
    subsequently contacting the media with the iron powder such that the iron powder contacts the halogenated hydrocarbons contained in the media; and
    causing reduction of halogenated hydrocarbons.

13. The method according to claim 12, wherein the forming of Fe—S is conducted by manufacturing the iron powder by water atomization of molten steel.

14. The method according to claim 12, wherein the S content of the iron particles is about 0.1 to about 0.4%.

15. A method of remediating media contaminated with halogenated hydrocarbons comprising:
    forming Fe—S based inorganic compounds mainly comprising sulfur on at least portions of surfaces of iron powder particles containing about 0.1 to about 2% by mass of sulfur and about 0.06% by mass or less of manganese, based on the mass of the iron powder, wherein the Fe—S based inorganic compounds are formed by precipitation of iron and sulfur contained in the iron powder particle, and wherein the forming of Fe—S is conducted by manufacturing the iron powder by water atomization of molten steel;
    subsequently contacting the halogenated hydrocarbons contained in the media with the iron powder; and
    causing reduction of halogenated hydrocarbons.

16. The method according to claim 15, wherein the S content of the iron particles is about 0.1 to about 0.4%.

* * * * *

UNITED STATES PATENT AND TRADEMARK OFFICE
CERTIFICATE OF CORRECTION

| | |
|---|---|
| PATENT NO. | : 7,166,759 B2 |
| APPLICATION NO. | : 10/045316 |
| DATED | : January 23, 2007 |
| INVENTOR(S) | : Nakamaru et al. |

It is certified that error appears in the above-identified patent and that said Letters Patent is hereby corrected as shown below:

<u>In Column 2</u>

At line 30, please delete "OBJECT OF THE INVENTION".

Signed and Sealed this

Seventeenth Day of July, 2007

JON W. DUDAS
*Director of the United States Patent and Trademark Office*